US007006878B2

(12) United States Patent
Schweizerhof et al.

(10) Patent No.: US 7,006,878 B2
(45) Date of Patent: Feb. 28, 2006

(54) COMPUTER-IMPLEMENTED METHOD FOR ANALYZING A PROBLEM STATEMENT BASED ON AN INTEGRATION OF SIX SIGMA, LEAN MANUFACTURING, AND KAIZEN ANALYSIS TECHNIQUES

(75) Inventors: Evelitsa Schweizerhof, Farmington, MI (US); Katherine McRae, Bloomfield Township, MI (US)

(73) Assignee: Ford Motor Company, Dearborn, MI (US)

( * ) Notice: Subject to any disclaimer, the term of this patent is extended or adjusted under 35 U.S.C. 154(b) by 81 days.

(21) Appl. No.: 10/708,057

(22) Filed: Feb. 5, 2004

(65) Prior Publication Data

US 2005/0177260 A1    Aug. 11, 2005

(51) Int. Cl.
G05B 13/02    (2006.01)
(52) U.S. Cl. .......................... 700/51; 700/49; 700/50; 700/108; 700/109; 700/110; 702/81; 702/84; 702/179; 702/181; 702/182
(58) Field of Classification Search .................. 700/49, 700/50, 51, 109, 110, 108; 702/81, 84, 179, 702/181, 182
See application file for complete search history.

(56) References Cited

U.S. PATENT DOCUMENTS

| | | | |
|---|---|---|---|
| 6,539,271 | B1 | 3/2003 | Lech et al. |
| 6,772,034 | B1 * | 8/2004 | Shi et al. .................... 700/121 |
| 6,816,747 | B1 * | 11/2004 | Mammoser et al. ........ 700/109 |
| 6,865,497 | B1 * | 3/2005 | Xie et al. ..................... 702/84 |
| 2002/0026257 | A1 | 2/2002 | Newmark |
| 2002/0040302 | A1 | 4/2002 | Gau et al. |
| 2005/0033468 | A1 * | 2/2005 | Pate et al. ................... 700/110 |

OTHER PUBLICATIONS

Inventory management KaizenPalmer, V.S.Engineering Management for Applied Technology, 2001. EMAT 2001. Proceedings. 2nd International Workshop on 2001 Page(s): 55-56.*
Modeling of an integrated quality system using IDEFO Rowlands, H.; Richards, C. Industrial Electronics, 2002. ISIE 2002. Proceedings of the 2002 IEEE International Symposium on vol.: 4 2002 Page(s): 1364-1369 vol. 4.*
Lean Sigma [production and supply chain management] Antony, J.; Escamilla, J.L.; Caine, P. Manufacturing Engineer vol.: 82 Issue: 2 Apr. 2003 Page(s): 40-42.*
Managing agility for profitability Hayman, A.N. Engineering Management Conference, 2004. Proceedings. 2004 IEEE International vol.: 1 Oct 18-21, 2004 Page(s): 1-5 vol. 1.*
"The CNC's Role in Six Sigma Lean Manufacturing," "Total Productive Maintenance *Six Sigma Lean Manufacturing Solutions*," 1997-2002.
M. George, "Ask the Expert Integrating Lean And Six Sigma," iSixSigma LLC, 2000-2003, 2 pages.
N. Goyal, "Applying Lean Manufacturing To Six Sigma—A Case Study," iSixSigma LLC, 2000-2003, 4 pages.
M. Baudin, "Six Sigma and Lean Manufacturing," The E-Newsletter of Lean Manufacturing, Jul. 2002, 6 pages.

(Continued)

Primary Examiner—Ramesh Patel
(74) Attorney, Agent, or Firm—David B. Kelley; Brooks & Kushman (57) ABSTRACT

A computer-implemented method for analyzing problem statements. The method includes focusing the problem statement into an operation definition and then assigning a level indicator to the operation definition. The method further includes analyzing the problem statement based on the operational definition and the level indicator in a cost and time effective manner and without the need for an expert to customize an analysis schedule for each problem.

20 Claims, 6 Drawing Sheets

OTHER PUBLICATIONS

J. Illing, "Seamless Integration of Lean Enterprise And Six Sigma," SAE International, 2003, 3 pages.
"Advanced six sigma & lean manufacturing training through SigmaNow™," Six Systems, Inc., 1999-2002, 1 page.
"Six Sigma Systems—Leaders in Learning for the Bottom Line," Six Sigma Systems, Inc., 1999-2002, 2 pages.
Kaizen College, "Making Good Businesses Great", Programme 2003-2004, 24 pages.
Terence T. Burton, "Is This a Six Sigma, Lear, or Kaizen Project ?", 2000-2003, iSixSigma LLC, 2 pages.
Johan Denecke, The AIT Group,"6 Sigma and Lean Synergy", Jan. 30, 2002, 10 pages.
Richard Trombly, "Running Lean Running Strong", Industrial Distribution, Aug. 2002, pp. 53-56.
Praveen Gupta, "Design for Six Sigma and Lean Manufacturing", Dec. 2001, Quality Technology Company, 3 pages.
James Illing, "Seamless Integration of Lean Enterprise And Six Sigma", SAE International, 3 pages.
Michael L. George, "Lean Six Sigma: Combining Six Sigma Quality with Lean Speed", McGraw-Hill, 2002.
www.isixsigma.com/library/content, "Is This a Sigma, Lean or Kaizen Project?" 12 pages, Jun. 18, 2003.
R. Trombly, "Running Lean Running Strong", Industrial Distribution, Aug. 2002, www.inddist.com, pp. 53-54 and 56.
M.L. George, "Lean Six Sigma: Combining Six Sigma Quality with Lean Speed", 2002, pp. 181-225, McGraw-Hill.
C. Ellins, "Kaizen College, Making Good Businesses Great", Programme 2003-2004, pp. 1-24.
P. Gupta, "Design for Six Sigma and Lean Manufacturing", Quality Technology Company, Dec. 2001, Circuits Asssembly, 3 pages.
www.sixsigmasystems.com, "Six Sigma Systems—Leaders in Learning for the Bottom Line", 1999-2002, Six Sigma Systems, Inc., 2 pages.
www.sixsigmasystems.com/six_sigma_sigmanow_training.htm, "Advanced six sigma & lean manufacturing training through SigmaNow™", 1999-2002, Six Sigma Systems, Inc., 1 page.
www.store.sae.org/topics/leanfeb01.htm, "Seamless Integration of Lean Enterprise And Six Sigma", 2003, SAE International, 3 pages.
M. Baudin, "Six Sigma and Lean Manufacturing", The E-Newsletter of Lean Manufacturing, Jul. 2002, 6 pages.
www.geindustrial.com/cwc/gefanuc/LeanSigmaCNC.html, "The CNC's Role in Six Sigma Lean Manufacturing", 1997-2002, General Electric Company, 2 pages.
www.isixsigma.com/library/ask, "Ask the Expert Integrating Lean and Six Sigma", 2000-2003, iSixSigma LLC., 2 pages.
www.isixsigma.com/library/ask, N. Goyal, "Applying Lean Manufacturing To Six Sigma—A Case Study", 2000-2003, iSix Sigma LLC, 4 pages.

* cited by examiner

6-Sigma Kaizen Level 2
Daily Deliverables

| Monday (Day 1) Define | Tuesday (Day 2) Measure | Wednesday (Day 3) Analyze | Thursday (Day 4) Improve | Friday (Day 5) Control |
|---|---|---|---|---|
| Start Date: | Start Date: | Start Date: | Start Date: | Start Date: |
| ☐ Review Problem Statement w/defect(s) (Standards & process) | ☐ Brainstorm KPIVs (Xs) 7TW/5S/PM/QCO/QPS Correlation, Regression, or Screening DOE | ☐ Analyze KPIVs & Correlate to Y's | ☐ Diagnose KPIVs & Y Performance (DOE) | ☐ Establish or Update Standard Work Instructions (OIS, QPS, WES) with New Requirements and ISPCs, Single Point Lesson |
| ☐ ID Customers/CTQs | | ☐ Develope the Should be Process Map & Future Value Stream Map (QPS/WES) | ☐ Establish KPIVs & Y Performance Objectives | |
| ☐ Estimate Customer Satisfaction/COPQ Impact | ☐ Develope Measurement System | ☐ Root Cause Analysis (Hypothesis Testing) | ☐ ID Alternative Solutions | ☐ Apply Error Proofing |
| ☐ Review Work Instructions | ☐ Develope Data Collection Plan | | ☐ Determine Optimal Solution (Pay Off Matrix, DOE) | ☐ Develope Control Metrics (SPC) on KPIVs |
| ☐ VOC/SDS/VOP Benchmark | ☐ Analyze & Validate Measurement System | ☐ Error Proof (EP) Opportunities for KPIVs | ☐ Update FMEA | ☐ Develope Monitor Plan (SPM) on KPOV |
| ☐ Y=f(x) | ☐ Perform or Review FMEA | | ☐ Cost/Benefit Analysis | ☐ Develope Long Term MSA Plan |
| ☐ ID KPOV Metrics (QPS/SDS>Ys) | ☐ Collect Data | ☐ Define Performance Objectives | ☐ Develope & Implement Pilot Plan | ☐ Establish or Update Training Plan |
| ☐ Define "Y" Operation Definition | ☐ Establish SPC & Baseline DPMO/Sigma Level | | ☐ Validate Should Be Process | ☐ Train New Standards & Process |
| ☐ Review & ID 7 Types of Waste | ☐ ID Lean & Project Objectives | | ☐ Update New Standards & Process Map/Value Stream Map | ☐ Validate Control Plan by Process Owner |
| ☐ Review Value Stream Map | ☐ Review of Daily Deliverables & Project Champion Approval | ☐ Review of Daily Deliverables & Project Champion Approval | ☐ Review of Daily Deliverables & Project Champion Approval | ☐ Establish Audit Plan |
| ☐ Access Waste Elimination Tools | | | | |
| ☐ ID Project Scope (Y=f(x)) | | | | ☐ Review of Daily Deliverables & Project Champion Approval |
| ☐ Create Project Timeline | | | | |
| ☐ Daily Deliverables & Project Champion Approval | | | | ☐ OCM Report Out |

Fig-3

6-Sigma Kaizen Level 3
(Stronger Focus on Green)
Daily Deliverables

| Monday (Day 1)<br>Define | Teusday (Day 2)<br>Measure | Wednesday (Day 3)<br>Analyze | Thursday (Day 4)<br>Improve | Friday (Day 5)<br>Control |
|---|---|---|---|---|
| Start Date: | Start Date: | Start Date: | Start Date: | Start Date: |
| ☐ Review Problem Statement w/defect(s) (Meas. system) | ☐ Brainstorm KPIVs (Xs) TTW/5S/PM/QCO/QPS | ☐ Micro Level Process Map (QPS/WES) | ☐ Diagnose KPIVs & Y Performance | ☐ Apply Error Proofing |
| ☐ ID Customers/CTQs | ☐ Develope Data Collection Plan | ☐ Quantify KPIVs & Improvement Opportunities | ☐ Establish KPIVs & Y Performance Objectives | ☐ Develope Control Metrics (SPC) on KPIVs |
| ☐ Estimate Customer Satisfaction/COPQ Impact | ☐ Analyze & Validate Measurement System | ☐ Root Cause Analysis (Hypothesis Testing) | ☐ ID Alternative Solutions | ☐ Develope Monitor Plan (SPM) on KPOV |
| ☐ Benchmark MSA | (Callibration & Gage R&R) | ☐ Error Proof (EP) Opportunities | ☐ Determine Optimal Solution (Pay Off Matrix) | ☐ Develope Long Term MSA Plan |
| ☐ Develope High Level Process Map (QPS) | ☐ Perform or Review FMEA | ☐ Define Performance Objectives | ☐ Update FMEA | ☐ Establish or Update SOPs, Single Point Lesson, FTPM/PM |
| ☐ ID KPOV Metrics (QPS/SDS>Ys) | ☐ Collect Data | | ☐ Cost/Benefit Analysis | ☐ Establish or Update Training Plan |
| ☐ Review & ID 7 Types of Waste | ☐ Establish Baseline DPMO/Sigma Level | | ☐ Develope & Implement Pilot Plan | ☐ Train New Process |
| ☐ Review Value Stream Map | ☐ Access SPC for Special Causes | | ☐ Validate Improvements | ☐ Validate Control Plan by Process Owner |
| ☐ Access Waste Elimination Tools (5S/FTPM/QCO/Error Proof VF Opportunities) | ☐ Access Normality | | ☐ Update New Process Map/ Value Stream Map | ☐ Establish Audit Plan |
| ☐ Y=f(x) | ☐ Calculate Cpk | | | |
| ☐ ID Project Scope (Y=f(x)) | ☐ ID Lean & Project Objectives | | | |
| ☐ Create Project Timeline | | | | |
| ☐ Daily Deliverables & Project Champion Approval | ☐ Review of Daily Deliverables & Project Champion Approval | ☐ Review of Daily Deliverables & Project Champion Approval | ☐ Review of Daily Deliverables & Project Champion Approval | ☐ Review of Daily Deliverables & Project Champion Approval |
| | | | | ☐ OCM Report Out |

Fig-4

6-Sigma Kaizen Level 4
(Stronger Focus on Purple)
Daily Deliverables

| Monday (Day 1) Define | Teusday (Day 2) Measure | Wednesday (Day 3) Analyze | Thursday (Day 4) Improve | Friday (Day 5) Control |
|---|---|---|---|---|
| Start Date: | Start Date: | Start Date: | Start Date: | Start Date: |
| ☐ Review Problem Statement w/defect(s) (Meas. system) (Stability, Centering, Entitlement) | ☐ Brainstorm KPIVs (Xs) TTM/5S/PM/QCO/QPS | ☐ Micro Level Process Map (QPS/WES) | ☐ Diagnose KPIV, KPOV & EP Performance | ☐ Apply Error Proofing |
| ☐ ID Customers/CTQs | ☐ Develope Data Collection Plan | ☐ Quantify KPIVs & Improvement Opportunities (DOE) | ☐ Establish KPIV Performance Objectives | ☐ Develope Control Metrics (SPC) on KPIVs |
| ☐ Estimate Customer Satisfaction/COPQ Impact | ☐ Analyze & Validate Measurement System (Calibration & Gage R&R) | ☐ Evaluate Correlations | ☐ ID Alternative Solutions | ☐ Develope Monitor Plan (SPM) on KPOV |
| ☐ Benchmark Process & Product Overtime | ☐ Perform or Review FMEA | ☐ Estalish Relationships & Dependency Y=f(x) (Regression) | ☐ Determine Optimal Solution (DOE & Pay Off Matrix) | ☐ Develope Long Term MSA Plan |
| ☐ Develope High Level Process Map (QPS) | ☐ Collect Data | ☐ Hypothesis Testing | ☐ Update PFMEA | ☐ Establish or Update SOPs, Single Point Lesson, FTPM/PM |
| ☐ ID KPOV Metrics (QPS/SDS>Ys) | ☐ Establish Baseline DPMO/Sigma Level | ☐ Root Cause Analysis | ☐ Cost/Benefit Analysis | ☐ Establish or Update Training Plan |
| ☐ Review & ID 7 Types of Waste | ☐ Access SPC for Special Causes | ☐ Error Proof (EP) Opportunities | ☐ Develope & Implement Pilot Plan | ☐ Train New Process |
| ☐ Review Value Stream Map | ☐ Access Normality | | ☐ Validate Improvements | ☐ Validate Control Plan by Process Owner |
| ☐ Access Waste Elimination Tools (5S/FTPM/QCO/Error Proof VF Opportunities) | ☐ Calculate Cpk | ☐ Define Performance Objectives | ☐ Update New Process Map/ Value Stream Map | ☐ Establish Audit Plan |
| ☐ Y=f(x) | ☐ ID Lean & Project Objectives | | | |
| ☐ ID Project Scope (Y=f(x)) | | | | |
| ☐ Create Project Timeline | | | | |
| ☐ Daily Deliverables & Project Champion Approval | | | | |
| ☐ Review of Daily Deliverables & Project Champion Approval | ☐ Review of Daily Deliverables & Project Champion Approval | ☐ Review of Daily Deliverables & Project Champion Approval | ☐ Review of Daily Deliverables & Project Champion Approval | ☐ Review of Daily Deliverables & Project Champion Approval |
| | | | | ☐ OCM Report Out |

Fig-5

COMPUTER-IMPLEMENTED METHOD FOR ANALYZING A PROBLEM STATEMENT BASED ON AN INTEGRATION OF SIX SIGMA, LEAN MANUFACTURING, AND KAIZEN ANALYSIS TECHNIQUES

BACKGROUND OF INVENTION

1. Field of the Invention

The present invention relates to methods for analyzing problem statements of the type which involve analyzing the problem statement according to an integration of Six Sigma, Lean Manufacturing, and Kaizen analysis techniques.

2. Background Art

The analysis of problem statements is one means by which manufacturing companies can trouble-shoot and improve manufacturing. Six Sigma, Lean Manufacturing, and Kaizen techniques are some of the preferred techniques for analyzing problems.

It is desirable to integrate various aspects of the different analysis techniques when analyzing the problem statements. Typically, such integration requires an operator with vast experience with each analysis technique to develop a customized analysis schedule based on the particular problem statement. This makes it difficult as there are many problems which need analysis and too few experts to customize particular analysis techniques.

In the past, this problem was addressed by creating robust one size fits all analysis schedules. These robust schedules would generally comprise a number of analysis portions which together formed the integration of the different analysis techniques (i.e. Six Sigma, Lean Manufacturing, and Kaizen), regardless of whether the analysis techniques were actually needed.

Because the one-size fits all schedules failed to eliminate the unnecessary analysis techniques, resources would be allocated for the unneeded analysis techniques, adding excessive costs and time to the problem analysis.

Accordingly, there exists a need to analyze problems in such a manner that includes the integration of Six Sigma, Lean Manufacturing, and Kaizen in a cost and time effective manner and without the need for an expert to customize an analysis schedule for each problem statement.

SUMMARY OF INVENTION

It is, therefore, an object of the present invention to provide a method for analyzing problems which includes the integration of Six Sigma, Lean Manufacturing, and Kaizen analysis techniques in a cost and time effective manner and without the need for an expert to customize an analysis schedule for each problem.

One aspect of the present invention relates to a computer-implemented method to analyze a problem statement. The method includes analyzing the problem statement according to a systematic set of predefined criteria to focus the problem statement in terms of an operational definition. The method further includes assigning a level indicator to the operational definition and analyzing the focused operational definition based on the level indicator.

The method can include one or more computers for automatically generating a multiple-day Six Sigma Kaizen schedule based on the level indicator. Preferably, the computer generates a schedule which focuses on institutionalized standards and processes for a level II indicator, on defect appearance measurement systems and processes for a level III indicator, and on defect origination process controls for a level IV indicator.

One aspect of the present invention relates to a computer configured with instructions for analyzing a problem statement. The computer includes instructions for analyzing the problem statement according to a systematic set of predefined criteria to focus the problems statement in terms of an operational definition. The computer further includes instructions for assigning a level indicator to the operational definition. The computer still further includes instructions for analyzing the focused operational definition based on the level indicator.

BRIEF DESCRIPTION OF DRAWINGS

FIG. 3 illustrates a level II Six Sigma Kaizen schedule in accordance with the present invention;

FIG. 4 illustrates a level III Six Sigma Kaizen schedule in accordance with the present invention; and FIG. 5 illustrates a level IV Six Sigma Kaizen schedule in accordance with the present invention.

DETAILED DESCRIPTION

Figure 1:
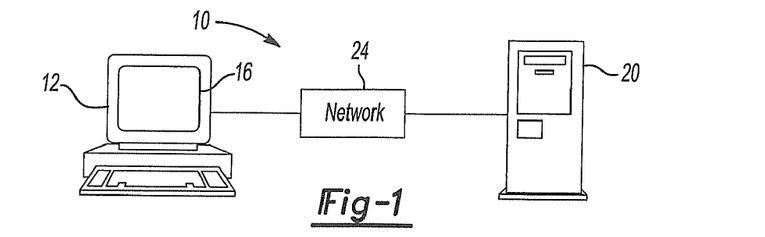
FIG. 1 illustrates a system for a method of analyzing a problem statement in accordance with the present invention.

FIG. 1 illustrates system 10 for analyzing a problem statement in accordance with the present invention. System 10 is configured to provide a user with a number of operation and decision making instructions which the user can follow to analyze a problem.

To facilitate the analysis process and to direct less experienced users, computer 12 can include graphical display 16 instructions. The user can follow the instructions to analyze the problem. The computer can also be configured to receive and store data entered by the user and to interact with database 20 over network 24. The present invention is not limited to the use of a computer, however. A computer is one way in which the method of the present invention can be applied.

Figure 2A:
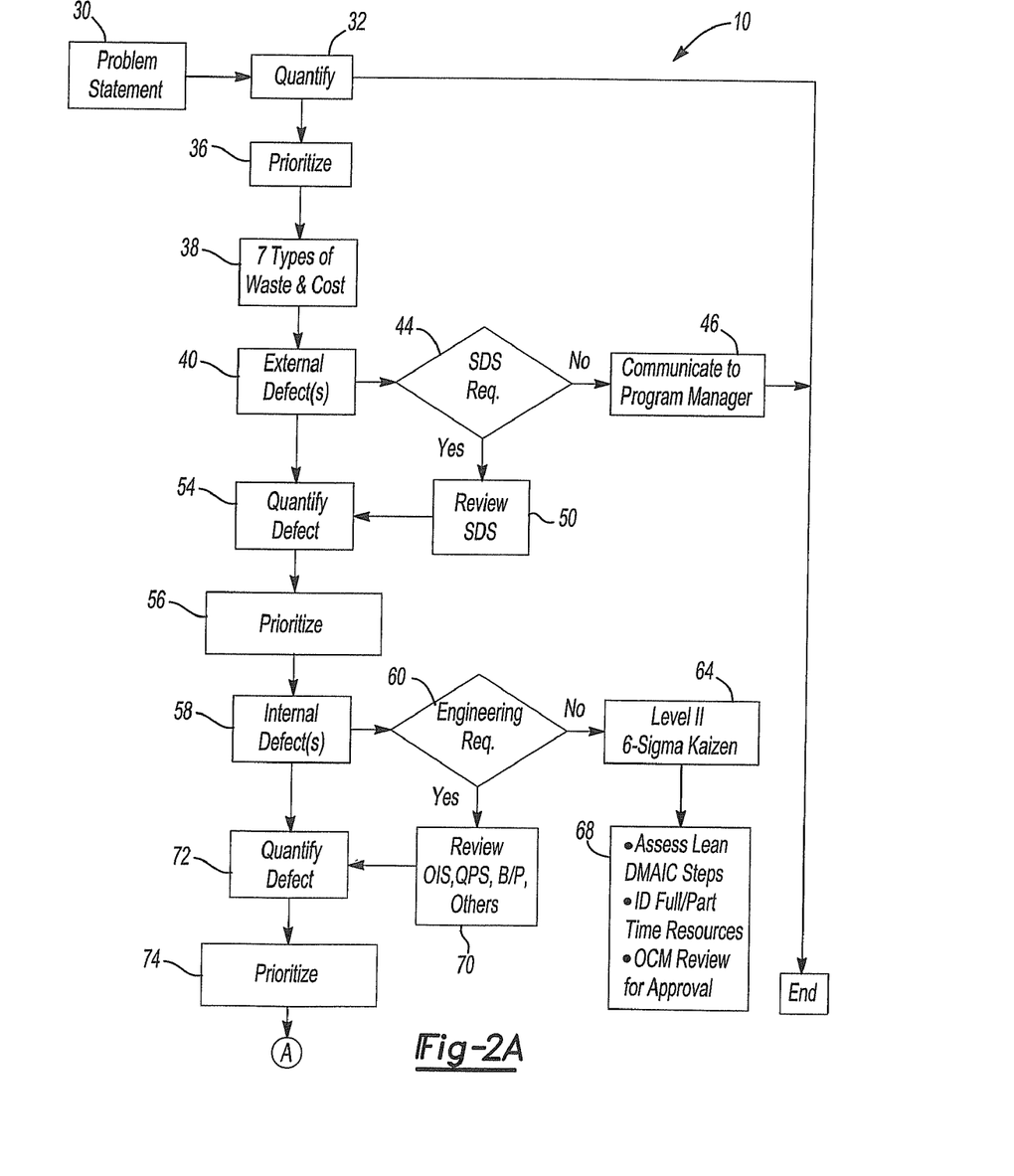
FIGS. 2a–2c illustrate a flowchart of the method for analyzing a problem statement in accordance with the present invention.
Figure 2B:
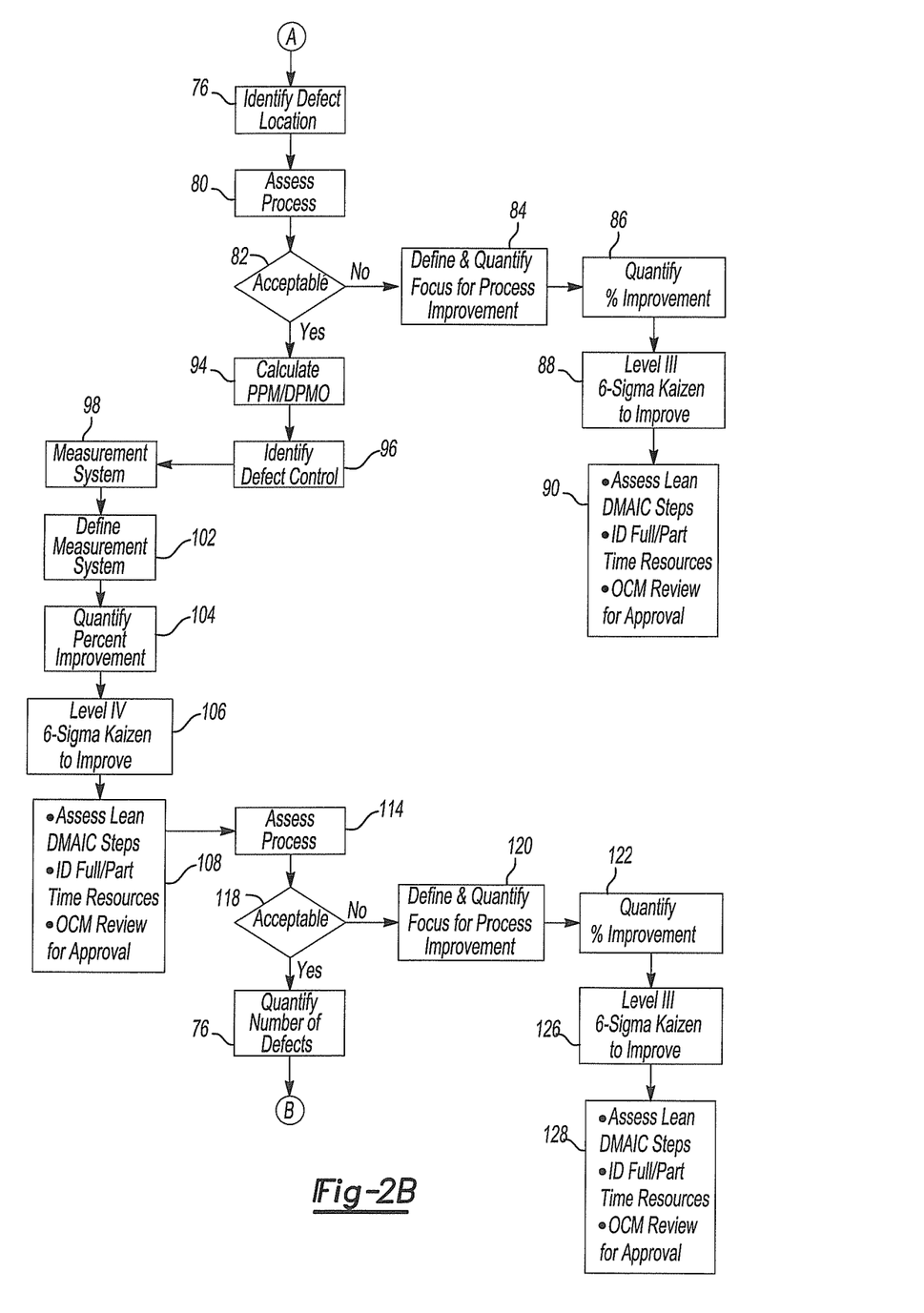
Figure 2C:
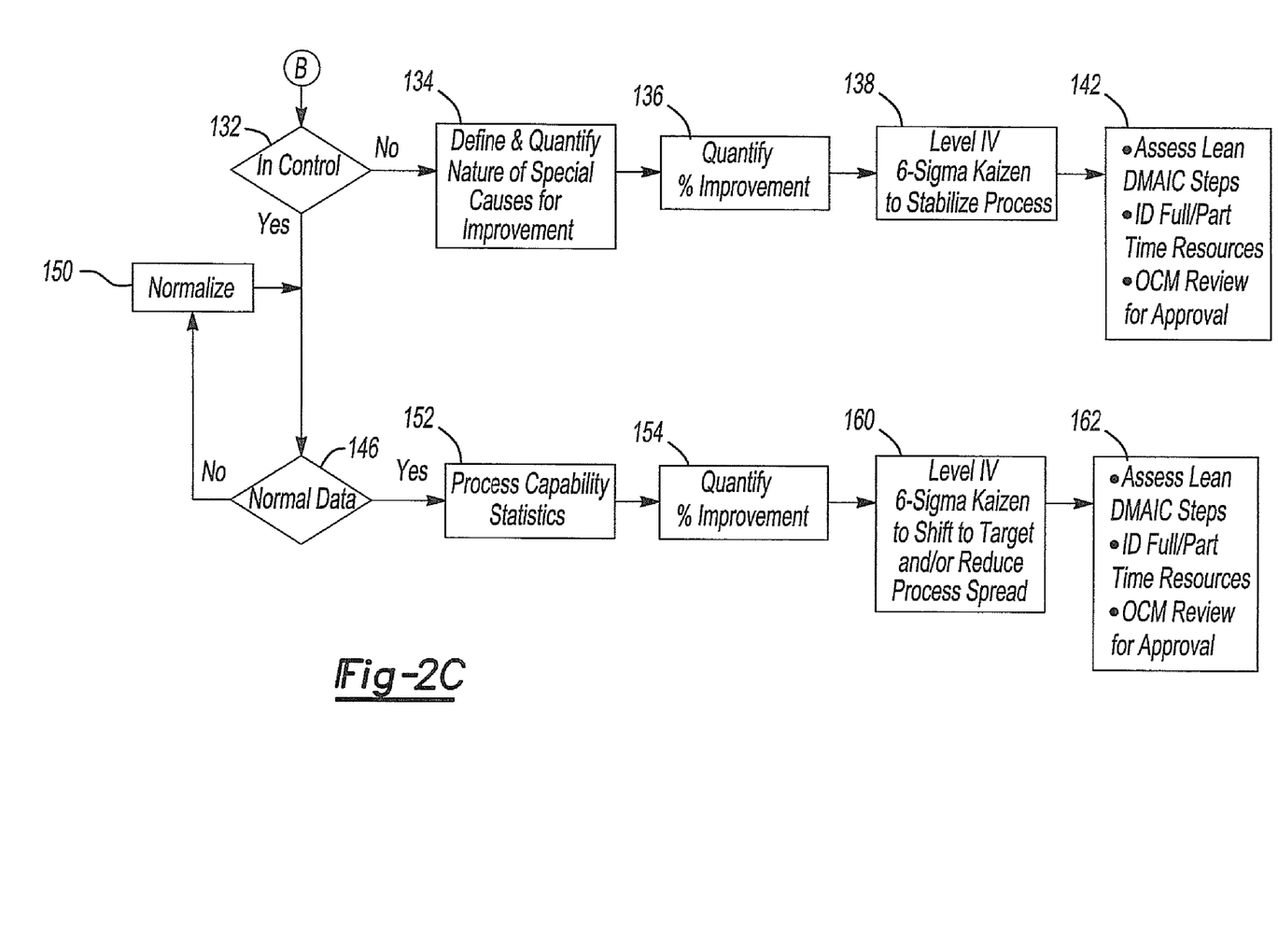

FIG. 2 illustrates flowchart 28 of a method for analyzing a problem statement in accordance with the present invention. In general, instructions representative of the method shown in flowchart 28 are provided by computer 12 to a user through graphical displaying 16. Preferably, the computer instructs the user to input data and follow the instructions for the blocks described below and shown in FIG. 2. Correspondingly, computer 12 can provide an input field or display field for receiving or displaying the instructions of each block. The user responds to the instructions by inputting a response to the computer. This can be done with a keyboard or other inputting means. The computer then provides further instructions to the user based on the user's inputted responses. The computer need not understand the data inputted by the user. The computer may perform some analyses on the fields to insure data has been inputted and that it has the right formatting. Thereafter, the computer provides the next set of instructions with the corresponding input fields.

The present invention, as described below, is particularly suited to manufacturing environments which include a number of processes for manufacturing a product. The method of the present invention can be used to analyze any portion of the manufacturing process. The present invention can also be used to analyze problems outside of the manufacturing environment such as in a transactional environment which include a number of processes providing a service (i.e, warranty processing, product design processes, financial processes, and others).

Block 30 relates to inputting a problem statement. The problem statement is a formalized definition of a problem which is to be analyzed. The problem statement is typically a high level generalization of the problem. The problem statement can include identifiable metrics and measurement sources related to the problem such that a description is provided for the problem that outlines standards, process locations and/or occurrences of problematic events in a manner that the scope of the problem is described in process terms. In addition, it can include other attributes, current performance, and the problem relationship to the customer.

Block 32 relates to inputting whether the problem statement can be quantified. Block 32 involves analyzing whether sufficient data is available to analyze the problem, whether it be technical, financial, or business oriented. The data provided should represent all variations of the process whether it be technical or transactional. Data used for quantifying the problem can be inputted into the computer. For example, the computer can include a field for receiving data based on cost, delivery, and quality. The cost relates to the cost in lost revenue due to the problem, and/or the cost to fix the problem. Delivery relates to the effect of the problem to on-time delivery of products or services to customers. Quality relates to whether the problem is related to the quality of the products and/or services as opposed to the cost or delivery.

Block 36 relates to prioritizing the problem based on the data inputted in block 32. The prioritization generally relates to determining whether the problem is more related to cost, quality, or delivery. This can be done by the computer organizing the data inputted in block 32 according to whether it is related to cost, quality, and/or delivery. The user then reviews this data to determine which has the highest priority, i.e., which business segment has the most opportunities for improvement. The most segment(s) with the most opportunities then becomes the focus of the problem analysis. This is done to i) directionally standardize and align the metrics throughout the analysis and ii) sustain a common focus.

Block 38 relates to inputting the seven types of Lean Manufacturing waste which are related to the cost, quality, and/or delivery problem that receives the highest prioritization in block. The seven types of Lean Manufacturing waste include overproduction, inventory, wait, conveyance, repair, over production, and motion. The users defines the types of waste affecting cost, quality, and/or delivery.

Block 40 relates to inputting external defects which may result from the seven types of waste. The external defects are factors which are occurring outside of the environment controlled by the manufacturing company, as voiced by the customer(s). For example, an external defect may be the defective quality of material provided by a supplier to the manufacturer. The external defects are inputted into the computer.

Block 44 relates to determining whether there are system design specification (SDS) for the external factors determined in block. The SDS relates to a specification which is provided by the manufacturer to the supplier, or whomever is the technical/transactional source of the external factor, which details the specification for the external factor. The computer can facilitate this by providing an interface where the user clicks to indicate whether a SDS is available.

Block 46 relates to terminating the analysis if there is no SDS for the external factor. This can be done by the computer generating a message or sending a message to a program manager. The absence of a SDS indicates that this portion of the process is not defined. Consequently, the computer indicates to the user the need to develop a SDS prior to continuing the analysis process. Preferably, a SDS would be developed and used for a period of time prior to continuing the analysis process so that historical data could be collected. Then the analysis would be repeated.

Block 50 relates to analyzing the sufficiency of the SDS. The computer prompts the user to gather the needed technical, subject matter, or other resource needed to analyze the SDS. This is a resource allocation aspect and requires someone skilled in the external factor to analyze whether the specification provided to the supplier or technical/transactional source is adequate, i.e. whether it is truly a contributing factor to the problem statement.

Block 54 relates to quantifying the one or more external defects identified in block. This quantification can include collecting historical data for the external defect, such as the number of defective parts or service received from the supplier or technical/transactional source over the last six to twelve months. In addition, it can include data regarding the cost, quality and/or delivery performance of the external defect. The object is to define a benchmark standard for the external defect relative to the corresponding SDS to determine whether the problem is being caused by the failure to meet that benchmark.

Block 56 relates to prioritizing the various external defects. This generally relates to determining which defects are playing a more than nominal role in the problem. As the problem may be characterized in a rather broad problem statement, there may be a number of external defects contribution to the problem but the individual contribution of the defect may be small. As such, it is desirable to eliminate these defects from further analysis. The computer can be used to perform statistical analyses to prioritize contribution. For example, the computer may be used to determine defective effect based on calculating the number of defective units received from the supplier or technical/transactional source over the preceding months. If the number is greater than a threshold then the computer would give the external defect category a corresponding high priority.

Block 58 relates to aligning the external defects with internal defects. In order for the external defect to result from the manufacturing or transactional process it must be related to a cause with a corresponding internal defect. For example, if an external defect is a supplier supplying substandard materials, then the aligned internal defect is the failure of the product made internally from the material to meet its design or quality specifications. To facilitate the alignment, the computer can optionally provide a number of classifications or segments of the internal defects which relate to the various external defects. The user can then link up the external defects with the internal defects.

Block 60 relates to determining whether engineering requirements are available for the internal defects aligned in block 58. The engineering requirements are similar to the SDS described above in block 46. The engineering requirements, however, are written according to the internal standards for the manufacturing company. For example, the SDS for a particular material and/or service may be included narrower dimensioning than the engineering or transactional requirements. This can be done so that the supplier provides material which is better than the material actually needed to meet the internal engineering requirements.

Block 64 relates to defining an operational definition for the problem statement if no engineering requirements exist for the internal defect. The operational definition is another description of the problem gleaned from the data gathered according to the foregoing blocks, but it is different in that it includes a level indicator and a specific focus. The Six Sigma Kaizen schedule associated with a level II indicator is described in more detail below and shown in FIG. 3.

Block 64 assigns a level II indicator. The level II indicator indicates that the gathered information is showing a need for engineering or transactional requirements. Accordingly, the analysis of the problem should focus on the engineering requirements, operational standards, or other process deficiency which resulted in the failure to include the engineering or transactional requirements. As such, a level II indication reveals that the analysis of 6-Sigma Kaizen, which is described in more detail below, should focus on internal process standards. The assigning of the level indicator is unique to the present invention and permits the tailoring of the analysis to the specific problem. In this manner, cost and time are reduced relative to the traditional processes discussed above as the analysis can then be correspondingly limited according to the focus of the level indicator. This eliminates some of the unnecessary analysis which otherwise would be included in the traditional methods.

Multiple operational definitions can be developed in block 64 if there are multiple internal defects in block 58. Each defect would be assigned a level II indication. Once the level indicator is assigned, a Six Sigma Kaizen schedule is automatically generated by the computer. The scheduled includes an integration of analysis techniques from Six Sigma, Lean Manufacturing, and Kaizen based on the level indicator.

Block 68 relates to assessing the types of Six Sigma and Lean Manufacturing techniques required to develop manufacturing or transactional process standards. The computer prompts the user to gather the needed technical, subject matter, or other resource needed for the analysis. This is a resource allocation aspect and requires someone skilled in the engineering or transactional environment to analyze whether the standards align with SDS and are acceptable as per customer requirements, i.e. whether it is truly a contributing factor to the problem statement. The computer develops a contractual agreement indicating the utilization of resources in time and space.

Block 70 relates to analyzing the sufficiency of the available engineering or transactional requirements. Documentation containing the requirements is analyzed and compared against all sources containing this information, for example, quality production system (QPS), work element sheet (WES), blue print (B/P), operator instruction sheet (OIS), and others. The computer prompts the user to gather the needed technical, subject matter, or other resource needed for the analysis. This is a resource allocation aspect and requires someone skilled in the engineering requirement to analyze whether the engineering or transactional requirements are adequate, i.e. whether it is truly a contributing factor to the problem statement.

Block 72 relates to quantifying the one or more internal defects identified in block 58. This quantification can include collecting historical data for the internal defect, such as the number of defective parts received from the supplier over the last six to twelve months. In addition, it can include financial data regarding the quality, cost and delivery of the internal defect. The object is to define a benchmark standard for the internal defect relative to the corresponding engineering or transactional requirement to determine whether the problem is being caused by the failure to meet that benchmark.

Block 74 relates to prioritizing the various internal defects. This generally relates to determining which internal defects are playing a more than nominal role in the problem. As the problem may be characterized in a rather broad problem statement, there may be a number of internal defects contribution to the problem, but the individual contribution of the defect may be small. As such, it is desirable to eliminate these defects from further analysis. The computer can be used to perform statistical analysis. For example, the computer may be used to determine defective effect based on calculating the number of defects received from the supplier over the preceding months. If the number is greater than a threshold then the computer would give the defect a correspondingly high priority.

Block 76 relates to identifying a defect appearance location for each internal defect. The defect appearance location corresponds with the portion of the manufacturing or transactional process in which the defect is appearing, not necessarily the source or origination of the defect. For example, if the supplied material is defective, the defect may not appear until welding or some other fabricating step in the process which occurs well after the material is received from the supplier. The computer can be used to provide a menu or other interactive feature of the different portions of the process. The user can then select the effected portion from the menu to indicate the defect appearance location. Preferably, an additional description is also inputted to clarify the location, but it may not always be needed.

Block 80 relates to assessing the measurement system performance at the defect appearance location. This generally relates to collecting historical and current data representing the entire process at the defect appearance location using the measurement devices and systems used at the portion of the manufacturing or transactional process where the defect appears. This information, can include calibration and gauge R&R (Repeatability and Reproducibility). The gathered information is then inputted to the computer.

Block 82 relates to determining whether the measurement system performance at the defect appearance location is acceptable. The computer quantifies performance regarding calibration and gage R&R for the defect appearance location measurement system. This performance is compared against a threshold to determine acceptability.

Block 84 relates to defining and quantifying a deficiency of the measurement system at the defect appearance location if the measurement system at the defect appearance location is unacceptable. This definition and quantification is used to characterize and indicate how much and the type of measurement improvement required of the measurement system to render the measurement system acceptability. The types of measurement improvement fall under, but not limited to: bias, linearity, stability, resolution, repeatability, and/or reproducibility. The type(s) of measurement improvement is selected based on the quantified deficiency against acceptability threshold. Preferably, as shown in block 86, an improvement percentage is defined for a type(s) of improvement. This information is then inputted into the computer.

Block 86 relates to quantifying the percent improvement required by the measurement system to become acceptable. The percent improvement is defined for each type of measurement requiring improvement.

Block 88 relates to defining an operational definition and assigning a level III indicator to the operational definition.

The level III indicator shows a need to focus the Six Sigma Kaizen on measurement systems and processes. The Six Sigma Kaizen schedule associated with a level III indicator is described in more detail below and shown in FIG. 3. The scheduled includes an integration of analysis techniques from Six Sigma, Lean Manufacturing, and Kaizen based on the level indicator.

Block 90 relates to assessing the types of Six Sigma and Lean Manufacturing techniques required by the type of measurement system improvement needed to render acceptability. The computer prompts the user to gather the needed technical, subject matter, or other resource needed for the analysis. This is a resource allocation aspect and may require someone skilled in the engineering or transactional environment to analyze whether the measurement system is adequate, i.e. whether it is truly a contributing factor to the problem statement. The computer develops a contractual agreement indicating the utilization of resources in time and space.

Block 94 relates to quantifying the number of defects determined at the defect appearance location when the measurement system used at the defect appearance location is acceptable. Preferably, data from the last six to twelve months is analyzed to establish process stability and capability. This historical data can be automatically provided by the computer accessing database or other system where the measurement system data may be stored, such as a quality control program which routinely receives quality control data. This data is used to represent the state of the process for common and special causes, allowing the user to establish a focus on process control for common or special causes. In the absence of historical data, the user develops a pilot by which units are tested as specified through power and sample size statistical techniques to fully represent the process. This data is used to analyze and establish the state of the process in terms of process stability and capability.

Block 96 relates to identifying the defect origination in terms of manufacturing or transactional process. The defect origination location (process) can be the same as the defect appearance location (process), representing the ideal state or it can be a different location (process). With respect to a non-conforming dimension or attribute, for example, the defect origination would be the portion of the manufacturing or transactional process where the non-conforming dimension or attribute is first created or built. The ideal state refers to identifying and controlling the non-conformance at the origination location process. In this case the origination location process and the appearance location process are the same process. This prevents passing on non-conforming dimensions or attributes to downstream processes, hence avoiding waste (delays, non-value added steps, cost, defects). The non-conforming dimension or attribute can however flow to downstream processes when the capability of the originator location process is unacceptable, lacking of means to measure and/or prevents non-conformances from occurring and flowing to the defect appearance location which is a downstream portion of the process where the non-conformance is first identified, as opposed to the origination location process which caused the defect to appear upstream. The computer provides a graphical representation of the location of all processes, including the defect origination and defect appearance processes through process mapping and value stream mapping techniques.

Block 98 relates to determining whether a measurement system and/or standards exist at the defect origination location. If no measurement system and/or standards exist at the defect origination location, the user enters the information in the computer.

Block 102 relates to defining the measurement system required at the defect origination location. This definition and quantification is used to characterize and indicate the type of measurement system required to render the measurement system acceptability. The types of measurement system considerations include, but are not limited to: 1) defining the type of data being measured, whether it is variable or attribute, 2) maximum allowed bias, 3) allowable percent linearity, 4) stability, 5) required resolution, 6) acceptable repeatability, and 7) acceptable reproducibility. This information is then inputted into the computer.

Block 104 relates to quantifying the percent improvement required by the measurement system to become established and acceptable. The percent improvements is defined by application acceptability standards defined for calibration and gage R&R.

Block 106 relates to defining an operational definition and assigning a level IV indicator to the operational definition. The level IV indicator shows a need to focus the Six Sigma Kaizen on measurement systems and processes. The Six Sigma Kaizen schedule associated with a level IV indicator is described in more detail below and shown in FIG. 5. The schedule includes an integration of analysis techniques from Six Sigma, Lean Manufacturing, and Kaizen based on the level indicator.

Block 108 relates to assessing the types of Six Sigma and Lean Manufacturing techniques required by the type of measurement system improvement needed to render acceptability. The computer prompts the user to gather the needed technical, subject matter, or other resource needed for the analysis. This is a resource allocation aspect and may require someone skilled in the engineering or transactional environment to analyze whether the measurement system is adequate, i.e. whether it is truly a contributing factor to the problem statement. The computer develops a contractual agreement indicating the utilization of resources in time and space.

Block 114 relates to assessing the measurement system established at the defect origination location. This generally relates to collecting historical and current data representing the entire process at the defect origination location using the measurement devices and systems used at the defect origination location to measure the defect. This information, may include calibration and gauge R&R (Repeatability and Reproducibility). The gathered information is then inputted to the computer.

Block 118 relates to determining whether the measurement system performance at the defect origination location is acceptable. The computer quantifies performance regarding calibration and gage R&R for the measurement system at the defect origination location. This performance is compared against a threshold to determine acceptability.

Block 120 relates to defining and quantifying a deficiency of the measurement system at the defect appearance location if the measurement system at the defect origination location is unacceptable. This definition and quantification is used to characterize and indicate how much improvement is required of the measurement system to render the measurement system acceptable. Preferably, as shown in block 122, an improvement percentage is defined. This information is then inputted into the computer.

Block 122 relates to quantifying the percent improvement required by the measurement system to become acceptable.

The percent improvement is defined for calibration and gage R&R. This information is inputted in the computer.

Block 126 relates to defining an operational definition and assigning a level III indicator to the operational definition. The level III indicator shows a need to focus the Six Sigma Kaizen on improving or designing a measurement system at the defect origination process. This focus can include improvements on bias, linearity, resolution, stability, repeatability and/or reproducibility issues associated with the measurement system. The data obtained to define measurement system deficiency is inputted in the computer to graphically display the type of focus. A focus around variability reduction, for example, entails focusing on the mechanics and operation of the gage itself. The Six Sigma Kaizen schedule associated with a level III indicator is described in more detail below and shown in FIG. 4. The level III indicator determined at block 36 limits the Six Sigma Kaizen to the information collected and inputted into the computer up to block 35. In this manner, the Kaizen is correspondingly limited to the measurement system at the defect origination location or defect origination process.

Block 128 relates to assessing the types of Six Sigma and Lean Manufacturing techniques on process control techniques required by the type of measurement system improvement needed to render acceptability. The computer prompts the user to gather the needed technical, subject matter, or other resource needed for the analysis. This is a resource allocation aspect and requires someone skilled in the engineering or transactional environment to analyze whether the measurement system is adequate, i.e. whether it is truly a contributing factor to the problem statement. The computer develops a contractual agreement indicating the utilization of resources in time and space.

Block 130 relates to quantifying the number of defects determined at the defect origination location when the measurement system used at the defect origination location is acceptable. Preferably, data from the last six to twelve months is analyzed. This historical data can be automatically provided by the computer accessing database or other system when the measurement system data may be stored, such as a quality control program which routinely receives quality control data. This data represents the variations of the process over time, hence covering all aspects of the process.

Block 132 relates to determining whether the data collected in block is in control. In other words, the data is analyzed, by the computer when possible, to determine whether it is in statistical control, and not a product of random root causes. The object is to use data for further analysis, which is in statistical control so that anomalies caused by extreme high and low datum are eliminated.

Block 134 defines and quantifies a nature of special causes needed for the improvement of the data if the data from block is out of control. This means further refinement is necessary to the data to eliminate the anomalies. Preferably, an improvement percentage is assigned at block 136.

Block 138 relates to defining an operational definition and assigning a level IV indicator to the operational definition. The level IV indicator focus on three process sub-levels: 1) control or stability, 2) centering, and 3) entitlement. Block 42 with level IV indicator shows a need to focus the Six Sigma Kaizen on statistical process control to achieving process stability. Process stability is represented by a constant mean and predictable variability over time. This focus includes removal of non-random or uncontrollable variation, often called special or assignable cause of variation, which is characterized by unnatural variation patterns that change over time. An unnatural pattern due to unpredictable events is called special cause variation. Historical and current data is inputted into the computer to perform this analysis. The identification of cyclical, sudden change, cumulative, stepping, and other non-random or unpredictable graphical trends, are types of unnatural patterns. The Six Sigma Kaizen schedule associated with a level IV indicator is described in more detail below and shown in FIG. 4. The level IV indicator determined at block 42 defines the Six Sigma Kaizen at sub-level 1 using the information collected and inputted into the computer up to block 42. In this manner, the Six Sigma Kaizen is correspondingly focused on process stability and the need to improve the process.

Block 142 relates to assessing the types of Six Sigma and Lean Manufacturing techniques required to establish process stability in a manufacturing or transactional process. The computer prompts the user to gather the needed technical, subject matter, or other resource needed for the analysis. This is a resource allocation aspect and may require someone skilled in the engineering or transactional environment to identify and analyze unnatural patterns, i.e. whether it is truly a contributing factor to the problem statement. The computer develops a contractual agreement indicating the utilization of resources in time and space.

Block 146 relates to determining whether the historical and current data collected in blocks 4 and/or 16 is normally distributed data. In other words, the data is analyzed, by the computer when possible, to determine whether it is normal or non-normal data. Most processes are normally distributed; however there are some processes that are non-normally distributed. Normally distributed data refers to data that approximately follows the distribution of the area under the curve of a Standard Normal Distribution (SND) so that the concepts and equations that define the SND may be used to describe the data and hence the process. Standard Normal Distribution represents the ideal standard to understand and predict normal data. A Standard Normal Distribution is defined by a mathematical model with continuous and smooth curve, which is symmetrical about a median, mean and mode of zero, a standard deviation of one, asymptotic tails encompassing a total areas under the curve of one. Normality of data provides well-defined procedures to analyze data. Preferably, the computer graphs or otherwise provides data distribution to assist with this determination. The object is to use in statistical control and normal data from a manufacturing or transactional process to analyze capability, including process centering/shifting and entitlement or process variation in reference to Customer, process, and/or product specification limit(s) or requirements.

Block 150 relates to normalizing the non-normal data. This process generally comprises the analysis of non-normal data using graphical and mathematical models. The object enters the data in the computer to perform a normality test of the data entered. There are several techniques that apply to normalizing the non-normal data. This techniques are as follows, but not limited to: 1) Box-Cox transformation to apply a mathematical model to normalize the data. The newly normalized data set is entered in the computer to conduct a normality test, if acceptable against threshold, then proceed to blocks 47 and 48, otherwise 2) graph the non-normal data in the computer to determine if there are multiple or multimodal distributions in the data set. When multiple distributions are compiled in the non-normal data set at hand, each distribution is separated and individually analyzed. The separated distributions are analyzed and tested for normality in the computer. If the newly separated distributions, each one is normally distributed and the data is coming from the same process, then proceed to quantifying the percent improvement, in block 47, required to eliminate multiple distributions and continue to block 48. However, if each newly normalized distribution represents a different process, then proceed to quantify the percent improvement for each process in block 47 and continue with block 48. If techniques 1 and 2 do not apply, 3) collect more data and redo techniques 1 and 2. If the data is still non-normal and 4) follows a Weibull distribution, then proceed to box 47 to perform a Weibull Capability Analysis. 5) If the data is still non-normal, return to block 39. 6) If data is still non-normal, process to conduct attribute process capability in Block 46.

Block 152 relates to determining process capability statistics in terms of centering or shifting around target or nominal values and entitlement or process variation in reference to specification limits using historical and current process data, which is in statistical control and normally distributed. Error proofing opportunities are assessed in terms of process flag condition, error, and defect or defective. Such as determining process capability statistics in terms of centering around target or nominal values and entitlement about customer specification limits using historical and current process data, which is in statistical control and normally distributed. Process capability measure process variation and centering relative to specification limit(s). Common measures of process capability are, but not limited to the following metrics: Z (Upper and Lower sigma score or level for short and long term data), Cp Upper (Short Term Capability Index in reference to Upper Specification Limit), Cp Lower, (Short Term Capability Index in reference to Lower Specification Limit), Cpk (short term Capability Index for processes whose target value is the midpoint between the specifications and it represents the smallest absolute value between Cp Upper and Cp Lower), Cpm (Capability Index for processes whose target is not the midpoint between specifications), Pp Upper (Long Term Capability Index in reference to Upper Specification Limit), Pp Lower, (Long Term Capability Index in reference to Lower Specification Limit), Ppk (short term Capability Index represents the smallest absolute value between Pp Upper and Pp Lower), DPMO Upper Specification Limit, (short and long term data for Defect Per Million Opportunities), DPMO Lower Specification Limit, (short and long term data for Defects Per Million Opportunities), PPM Upper Specification Limit, (short and long term data for Defective Parts per Million), PPM Lower Specification Limit, (short and long term data for Defective Parts Per Million). Preferably, the object enters the data in the computer to perform the analyses and selects the appropriate metrics to quantify and graph centering or deviation from target. Process centering refers to the allowable deviation of data distribution from nominal or target value, as specified by engineering or transactional requirements. Common capability indices used to analyze process centering are as follows, but not limited to: Z Lower, Z Upper, Cp Upper, Cp Lower, Cpk, Cpm, Pp Upper, Pp Lower, Ppk, DPMO Upper Specification Limit, DPMO Lower Specification Limit, PPM Upper Specification Limit, and/or PPM Lower Specification Limit. The object enters the data in the computer to analyze the process centering and determine deviation from target value. These metrics are analyzed in the computer to quantify the percent improvement, in block 47, to achieve acceptability on deviation or centering about the target value. Process entitlement refers to process variation in reference to specification limit(s). Process capability metrics used to measure process variation in reference to specification limit(s) are as followed, but not limited to: Cp (short term Capability Index for normal and statistically in control variable data), Pp (long term Capability Index for normal and statistically in control variable data), Z (long and short term variable or attribute data), DPMO (Short and Long term defect type attribute data) and PPM (Short and Long Term defective type attribute data). The object enters the data in the computer to quality and graph process variation acceptability in reference to customer specification limit(s). Block 47 refers to quantifying the percent improvement required to achieve process variation acceptability in reference to the Customer Limit(s). Weibull Capability analyses are performed on Weibully distributed data based of the shape and scale of process variable data. The object enters the data in the computer to calculate long term process capability, PpUpper, PpLower, Ppk, Pp, PPM Lower, and PPM Upper. Process shift and process variation is quantified in reference to Customer, process, product requirements or specification limits. The required percent improvement for process shifting and/or process variability is quantified in block 154.

Block 160 relates to defining an operational definition and assigning a level IV indicator to the operational definition for process capability. The level IV indicator shows a need to focus the Six Sigma Kaizen on process controls for achieving acceptable centering and/or entitlement around customer requirements. This focus includes centering or shifting the data distribution around customer target and/or reduction of the process spread or variation in reference to customer requirements. The Six Sigma Kaizen schedule associated with a level IV indicator is described in more detail below and shown in FIG. 5. The level IV indicator determine at block 160 limits the Six Sigma Kaizen to the information collected and inputted into the computer up to block 154. In this manner, the Six Sigma Kaizen is correspondingly limited to the process shifting and/or variability reduction of normal and statistically in control data in reference to customer requirements.

Block 162 relates to assessing the types of Six Sigma and Lean Manufacturing techniques required to establish acceptability for process shifting and/or process variability reduction. The computer prompts the user to gather the needed technical, subject matter, or other resource needed for the analysis. This is a resource allocation aspect may require someone skilled in the engineering or transactional environment to identify and analyze shift patterns and magnitude of process variation in reference to Customer, Process, Product requirements, i.e. whether it is truly a contributing factor to the problem statement. The computer develops a contractual agreement indicating the utilization of resources in time and space.

As described above, data is collected in a systematic fashion based on a number instructions provided by a computer and data inputted to the computer in response thereto. This systematic approach insures a level indicator is assigned to each problem statement and that a corresponding Six Sigma Kaizen schedule is developed form the level indicator and limited to the data inputted up to that point. In this manner, the level indicator sets the Six Sigma Kaizen schedule and the collected data together limit the scope, and thereby, the cost of the Six Sigma Kaizen analysis process.

FIGS. 3–5 illustrate the different multiple-day analysis schedules, which integrate different aspects of Six Sigma, Lean Manufacturing, and Kaizen into a schedule based on the level indicator and the corresponding operation definition in accordance with the present invention.

FIG. 3 illustrates a level II Six Sigma Kaizen schedule, which is used to develop process standards and processes using Six Sigma, Lean Manufacturing tools and Kaizen principles. This schedule is generally preceded by allocating a Six Sigma Kaizen Sensei to Six Sigma Kaizen efforts. For example, a Six Sigma Kaizen Sensei is the subject expert matter in the application of Six Sigma, Lean Manufacturing and Kaizen principles. The Sensei leads the events throughout all five days, providing coaching, training, assignment of tasks, and review of assignments, level II operational definition, approved business case, and approved contract of resources required for the Six Sigma Kaizen. The level II Six Sigma Kaizen schedule consists of five days of training and application of project based DMAIC, Lean Manufacturing tools and Kaizen principles. Each day contains assignments to be delivered daily in a time effective manner. A typical schedule is shown in FIG. 3 as a five-day DMAIC and Lean tools format, where each day corresponds to a phase of D-M-A-I-C with Lean Manufacturing application. For example, Day 1 relates to the Define Phase of Six Sigma with applied key Lean Manufacturing tools, Day 2 relates to Measure and key Lean Manufacturing tools, Day 3 relates to Analyze with the application of key Lean Manufacturing tools, Day 4 refers to Improve and key Lean Manufacturing tools, and Day 5 relates to Control with key Lean Manufacturing tools. In order to advance to the next day, the object and team must complete all requirements of day in progress. These daily requirements include, training, application of training, and delivery of results assigned the day in question. However, more or less days could similarly be used without deviating from the scope and contemplation of the present invention. Each day is structured in three segments: 1) project based training of tools (6-Sigma and Lean) required for the project(s), followed by the assignment of specific tasks and objectives for a team to 2) apply the tools learnt and 3) deliver tangible results in a day time frame. This structure is followed throughout five days to deliver improvements and closure in a time efficient manner.

Day 1 of Level II Six Sigma Kaizen schedule relates to using the operational definition for Level II to establish and design the historical or benchmark information related to standards and processes needed to meet safety, cost, quality and delivery standards, as mandated by the customer and business. This can be accomplished through identification of all customers affected by the inefficiencies induced by the lack of standards and processes associated with a specific product and/or service are listed along with the critical form, fit, and/or functionality impacted by this inefficiency. For example, all product and/or service characteristics wanted by the customer are considered desirable or critical to quality (CTQ). Therefore, any CTQ affected by the inexistence of standards and processes must be listed and documented from the customers' perspective. Further, estimation of customer satisfaction is determined based on the CTQs affected by the inexistence of standards and processes. For example, the customer received a defective unit, in this case misaligned headlight because headlight alignment standards were not defined, hence a process was not established and a defect was created, not allowing internal detection of defect. This type of defects are evaluated to understand their impact on the Cost of Poor Quality (COPQ). A cost analysis is performed to translate process inefficiencies such as additional material for repair, additional labor hours for transportation, and others into hard and soft savings. Revision and analysis of process work instructions is performed to identify potential process requirements and standards. Benchmarks are inputted for the Voice of the Customer (VOC), Engineering System Design Specification (SDS), and the Voice of the Process (VOP) against internal and/or external systems to establish process requirements and/or standards required to deliver on customers and business expectations. The transfer function Y=f(x) is developed, where Y is defined as a function of X or process input variables. Identification of the key process output variable(s), (KPOV) and Y metrics using relevant information stated in Engineering System Design Specification and Process Work Instructions (such as Quality Process System, Operator Instruction Sheet, and others) are made. An operational definition is established for key Ys and preliminary process standards. The seven types of waste are identified, documented and quantified during a process walk to remove non-value added requirements and process steps. A Review Value Stream Map is done to graphically locate the seven types of waste not captured during the process walk. An identification of the potential waste elimination tools required to tackle the seven types of waste is done, allowing new standards to be developed for enhanced process efficiency. An identification of the project scope or focus based on the information gathered from 1–11 is done. A timeline is created to apply Waste elimination tools and DMAIC within a 3–5 day time window. The results obtained from 1–13 are reviewed with the project champion to approve the successful completion of Day 1 assignments. This approval will allow the team to advance to Day 2, Measure phase with applied Lean tools. The resource required for each schedule, thus must be present for the days defined on this document. The schedule is advantageous in this regard as only necessary resources are required to be present on the scheduled day as opposed to having unnecessary resource present on the mere chance that they may be used. Preferably, the computer displays the schedule in each corresponding box, such that the user can click on the box to indicate completion of the item. With each completion, the computer also optionally provide an input screen to input data for the current item. This data can then be stored, and if necessary, used with the execution of subsequent items.

Day 2 relates to the measurement and acquisition of new data relevant to the process input (Xs) and output (Ys) variables to quantify and prioritize key Xs and Ys governing value add process steps, process performance, and capability. This can be accomplished with the completion of Day 1 deliverables, which serve as the foundation for Day 2. For example, the customer impact, history and benchmark, operational definition of Y vs. process requirements, types of waste identified in the value stream map, and Customer CTQ among others, represent key information from Day 1, required in the brainstorming of key process input variables, data collection process, measurement system validation, to mention a few. Day 2 builds from Day 1 and it is accomplished through following actions described below. Brainstorming all process input variables potentially associated with the yielding of the process output Y is done. The key process input variables, KPIVs, (Xs) are identified based on data analysis and history of known performance obtained in Day 1. Some of the effective tools used to determine the KPIVs include, but not limited to: 5S (sort, shine, standardize, sustain, straighten) organizational performance, Preventive Maintenance baseline, Quick Change Over opportunities, Quality Process Sheets for process standards on Xs and Ys, Correlation, Regression, Binary Logistic Regression, Screening Design of Experiments, Transfer Functions, and others. A measurement System is developed to quantify the effects of the KPIVs or Xs on the key process output variable(s), Y(s). A Data Collection Plan is developed to identify the sampling size, sampling rate, operators to collect data, time required for data collection, and test conditions required to measure the Xs and Ys. The Measurement System is analyzed and validated to ensure that it meets the industry standards for acceptability on Calibration, Repeatability and Reproducibility requirements. Failure Mode and Effects Analysis is performed and reviewed to outline failures, mechanisms, causes, and effects with quantifiable detection, occurrence and severity rates. These rating numbers are used to further prioritize the Xs and Ys using the Risk Priority Number (RPN) to identify key relationships. Variable or attribute is collected to quantify process performance. Establish Baseline DPMO/Sigma Level is established to quantify process stability and capability. This information is used to determine if process is predictable and capable to meeting customer standards, that is no special causes of variation and a Z score or sigma level of 3, as minimum requirements. Preliminary KPIVs performance limits are also measured and documented to later establish standards required to achieve stability and capability, as defined by the Customer on Day 1. Lean and DMAIC Project Objectives required to develop process and standards (for KPIVs and KPOVs) in Day 3 are identified. The project champion then reviews the results obtained from the above to approve Day 2 assignments for successful completion. This approval will allow the team to advance to Day 3, Analyze phase with applied Lean tools.

Day 3 relates to analyzing the data acquired in day 2 to establish a relationship between the key process input and output variables and subsequently design the most efficient steps required to process a product or service. For example, benchmark data and Y=f(X) transfer function from Day 1 along with baseline information and measurement system work from Day 2 are highly used to develop a preliminary process with standards in Day 3. Therefore, Days 1 and 2 assignments must be completed in order to start Day 3. Preliminary standardized work instructions (such as Quality Process System, Work Element Sheets, Operator Work Instructions) start emerging during Day 3. This can be accomplished as described below. Correlation and regression between KPIVs and KPOVs is analyzed. Customer and process data is entered by the object in the computer to quantify correlation and regression statistically and graphically. The preliminary steps required to process the product or service most efficiently are listed. For example, use the list of preliminary process steps and process map and value stream mapping symbols to develop a graphical representation of the operational steps and future state required to deliver a quality and cost effective product or service in a time effective fashion. Lean Manufacturing tools are used to achieve the most efficiency in the process. For example, value stream, 5S, FTP, QCO, and others such as error proofing are highly used to maximize process efficiency over time. Preliminary work instructions are developed during this stage (such as Quality Process System, Work Element Sheets, Operator Instruction Sheets). A root cause analysis is conducted on preliminary or should be process map to develop theories on cause and effect relationships based on the information and data analysis derived from Days 1 and 2 up to this point. Hypothesis testing is recommended in the root cause data analysis, as applicable. Error Proofing techniques are applied to identify link process conditions-errors-defects in the process map developed in Day 3. This linkage allows the object to gain a deeper understanding on developing robust processes. Define the performance objectives required to validate and improve the newly developed process and standards are defined. The project champion reviews then the results obtained from the above to approve the successful completion of Day 3 assignments. This approval will allow the team to advance to Day 4, Improve phase with applied key Lean tools.

Day 4 relates to the validation and improvement of newly proposed process and standards from Day 3. For example, validation and process enhancement is carried out through the following. KPIV & Y Performance are diagnosed. For example, the object enters KPIVs and KPOVs information; identified in previous days, in the computer to design an experiment for process validation. The team conducts Design of Experiments or alike techniques. The KPOVs is measured, graphed and analyzed against KPIVs to determine how KPIVs impact KPOVs performance. The model is reduced, keeping only statistically significant factors and interactions. The model is validated through several trials. Data is collected and used to develop a baseline for process stability and capability. Establish KPIVs & Y Performance Objectives are established to allow for stable and capable process. For example, no special causes of variation and Z score or sigma level of 3 or higher. Use model is created to evaluate and validate performance limits for KPIVs and KPOVs. The selection of optimal performance limits are also evaluated and validated against safety, quality, cost, delivery, environmental measures. For example, two sets of limits for KPIVs, A and B have been validated to provide similar performance on the output Y; however set A is less costly, faster, safer and provide the same quality and environment effects. Therefore, set A becomes the choice of standards for KPIVs and associated KPOV limits. This analysis is conducted to identify alternative and optimal process and standards. The Pay Off Matrix is commonly used to prioritize alternative and optimal solutions through the effort associated with implementing and using the new process and standards against the benefit resulting from this use. In the above example, a Pay Off Matrix can be used to graphically determine the best solution. In this case, the set of standards A can be shown to be more beneficial than B in terms of lower cost, faster process, and safer for the operator. The information developed through this point is valuable to a business and customers, therefore the object is to enter this information in the computer to systematically document findings. An updated Failure Mode and Effects Analysis (FMEA) is conducted using the previous documentation reviewed in Day 2 and all the information developed here. Once the FMEA is updated, a Cost and Benefit analysis is updated using the original model developed on Day 1 to adjust benefits and savings achieved on actual performance up to this point. A more detailed analysis is further conducted to Develop & Implement Pilot Plan to reconfirm achieved process performance, therefore allowing for Validation of the Should Be Process and new standards. For example, additional data is collected to ensure that business and customer standards were met. A customer clinic is an example of further analysis in which a group of customers are invited to test the product and/or service. These results are then used to Update New Process Map/Value Stream Map. The project champion then reviews the results obtained from above to approve the successful completion of Day 4 assignments. This approval will allow the team to advance to Day 5, Control phase with applied key Lean tools.

Day 5 relates to establishing final documentation and controls required to sustain the gains of the new process and standards developed through Day 4. For example, a control plan is developed to summarize all key actions required to maintain the new process and standards in control and capable. This can be achieved through the following. Standard Work Instructions (OIS, QPS, WES) are established or updated with new process steps, new requirements and all in station process controls (ISPC) developed through Day 4. For example, error proofing, 5S, Standardized Work Instructions, and Visual Aids and/or controls must be properly documented with Single Point Lessons summarizing the lessons learnt. Also, the team takes actions to Apply Error Proofing devices and/or concepts validated through Day 4. For example, a permanent error proofing device and/or concept is built and implemented for production. Next, the team is required to Develop Control Metrics (SPC) on KPIVs to monitor process performance. For example, all KPIVs settings or standards are to be measured and controlled to remain within the optimal performance defined on Day 4, maximizing performance on the KPOVs. Therefore, the team is to Develop Monitoring Plan (SPM) on KPOVs to ensure process remains stable and capable to defined standards. For example, the team enters the KPOVs from the newly developed process and standards in the computer to analytically and graphically illustrate acceptability or deviation from process and standards. Additionally, the object is to Develop a Long Term Measurement System Analysis (MSA) Plan to ensure acceptability. For example, the object defines a frequency for conducting calibration and Gage Repeatability and Reproducibility studies, as part of the control plan. The actions taken from above must be communicated to process owners, therefore the team is required to Establish or Update Training Plan to teach new process and standards to process users. For example, the team reviews the existing training plan and updates any information needed by the process owners, such as the supervisor, engineer, operator, and others to properly use the new process and standards for production. This material is then used by the team to Train new process and standards. For example, a training session is conducted and validated with supervisors to allow the process to be used in production. Items presented can represent the actions needed to continue sustaining the gains obtained through this point. Therefore, it is important to Validate Control Plan by Process Owner to obtain approval. It is also important to Establish an Audit Plan as part of the control plan to revisit the new process and ensure that all control actions are in compliance. The project champion then reviews the results obtained from above to approve the successful completion of Day 5 assignments. This approval will allow the team to advance to present achievement to the Operating Committee Management (OCM) Team during an OCM Report Out. For example, the team reviews all actions and assignments completed from Day 1 through Day 5 with the OCM. These assignments and results are documented by the team on large flip charts and posted on the walls of the 6-Sigma Kaizen room.

FIG. 4 illustrates a level III Six Sigma Kaizen schedule which is executed in a manner similar to that described above with respect to FIG. 3. It is used to develop and/or improve the measurement system of the defect appearance location, that is the process where the defect is first found and/or the defect origination process, that is where the process where the defect is created. These improvements are performed using Six Sigma, Lean Manufacturing tools and Kaizen principles. The purpose of conducting a Level III Six Sigma Kaizen is to evaluate and validate the overall capability of the measurement system flagging the defect(s) at the defect appearance location or at the defect origination process. If the measurement system is not acceptable, then a Level III Six Sigma Kaizen is scheduled. This schedule is generally preceded by allocation of Six Sigma Kaizen Sensei, the subject expert matter in the application and integration of Six Sigma, Lean Manufacturing and Kaizen principles. The Sensei leads the event through all five days, providing coaching, training, assignment of tasks, and review of assignments; Establishing Level III operational definition, Approval of business case, and resources required for the Six Sigma Kaizen (contract). The level III Six Sigma Kaizen schedule includes five days of training and application of project based DMAIC, Lean Manufacturing tools and Kaizen principles. Each day contains assignments to be delivered daily in a time effective manner. A typical schedule is shown in FIG. 4 as a five-day DMAIC and Lean tools format, where each day corresponds to a phase of D-M-A-I-C with Lean Manufacturing application. For example, Day 1 relates to the Define Phase of Six Sigma with applied key Lean Manufacturing tools, Day 2 relates to Measure and key Lean Manufacturing tools, Day 3 relates to Analyze with the application of key Lean Manufacturing tools, Day 4 refers to Improve and key Lean Manufacturing tools, and Day 5 relates to Control with key Lean Manufacturing tools. In order to advance to the next day, the object and team must complete all requirements of day in progress. These daily requirements include, training, application of training, and delivery of results assigned the day in question. However, more or less days could similarly be used without deviating from the scope and contemplation of the present invention. Each day is structured in three segments: 1) project based training of tools (6-Sigma and Lean) required for the project(s), followed by the assignment of specific tasks and objectives for a team to 2) apply the tools learnt and 3) deliver tangible results in a day time frame. This structure is followed throughout five days to deliver improvements and closure in a time efficient manner.

FIG. 5 illustrates a level IV Six Sigma Kaizen schedule which is executed in a manner similar to that described above with respect to FIG. 3. It is used to improve the specific aspects of the defect origination process controls, that is the process controls where the defect(s) is first created. For example, the focus of Level IV Six Sigma Kaizen is to improve the process controls, i.e., improving the defect origination process stability, shifting/centering, and/or variability reduction using Six Sigma, Lean Manufacturing tools and Kaizen principles. In the event that the measurement system of the defect origination process is found to be unacceptable, a Level III Six Sigma Kaizen schedule must be used before using a Level IV Six Sigma Kaizen schedule. A Level IV Six Sigma Kaizen schedule is generally preceded by: allocation of Six Sigma Kaizen Sensei, the subject expert matter in the integration of Six Sigma, Lean Manufacturing and Kaizen principles. The Sensei leads the event through all five days, providing coaching, training, assignment of tasks, and review of assignments; Establishing of Level IV operational definition, Approval of business case, and Approval of resources required for the Six Sigma Kaizen (contract). The level IV Six Sigma Kaizen schedule includes of five days of training and application of project based DMAIC, Lean Manufacturing tools and Kaizen principles. Each day contains assignments to be delivered daily in a time effective manner. A typical schedule is shown in a five-day DMAIC and Lean tools format, where each day corresponds to a phase of D-M-A-I-C with Lean Manufacturing application. For example, Day 1 relates to the Define Phase of Six Sigma with applied key Lean Manufacturing tools, Day 2 relates to Measure and key Lean Manufacturing tools, Day 3 relates to Analyze with the application of key Lean Manufacturing tools, Day 4 refers to Improve and key Lean Manufacturing tools, and Day 5 relates to Control with key Lean Manufacturing tools. In order to advance to the next day, the object and team must complete all requirements of day in progress. These daily requirements include, training, application of training, and delivery of results assigned the day in question. However, more or less days could similarly be used without deviating from the scope and contemplation of the present invention. Each day is structured in three segments: 1) project based training of tools (6-Sigma and Lean) required for the project(s), followed by the assignment of specific tasks and objectives for a team to 2) apply the tools learnt and 3) deliver tangible results in a day time frame. This structure is followed throughout five days to deliver improvements and closure in a time efficient manner.

In conclusion, the user is required to analyze the blocks FIG. 2 to establish a level indicator to define an operational definition and its corresponding Six Sigma Kaizen schedule. A Level II Operational Definition is established when blocks 30 through 60 have been analyzed. In this case, a Level II Six Sigma Kaizen schedule is assigned to develop and institutionalize standards and processes using pre-determined tools from Six Sigma, Lean Manufacturing tools and Kaizen principles. A Level II Six Sigma Kaizen schedule will not apply when standards and processes are clearly defined and institutionalized. At this point, the object proceeds with analyzing blocks 70 through 86, provided that blocks 30 through 60 are analyzed prior to block 70. A Level III Operational Definition is established when the analysis from blocks 30 through 86 indicates that the measurement system at the defect appearance location or defect appearance process is unacceptable. The error in the measurement system is beyond acceptable threshold levels. In this case, a Level III Six Sigma Kaizen schedule is assigned to develop or improve the measurement system belonging to the defect appearance process using pre-determined tools from Six Sigma, Lean Manufacturing tools and Kaizen principles. A Level III Six Sigma Kaizen Schedule will not apply when the object analyzes blocks 30 through 82, finding the measurement system at the defect appearance location to be acceptable. The analysis continues from block 94 through 118 to evaluate the acceptability of the measurement system at the defect origination process, provided that the analysis from block 30 through 82 is acceptable. A Level III Six Sigma Kaizen operational definition is developed at the defect origination process when its measurement system is found to be unacceptable. A Level III Six Sigma Kaizen schedule is used to improve the measurement system at the defect origination process using pre-determined tools from Six Sigma, Lean Manufacturing tools and Kaizen principles. A Level III Six Sigma Kaizen schedule will not apply at either defect appearance location or defect origination process when the analysis from block 30 through 118 is found to be acceptable. The object continues the analysis from block 130 through 154 to evaluate the process controls by evaluating the defect origination process in terms of statistical stability over time, centering capability with respect to a target value, and/or variability reduction with respect to process standards. A level IV operational definition is developed when the defect origination stability, centering, and/or process entitlement is determined to be unacceptable. A Level IV Six Sigma Kaizen schedule is used to improve process stability, centering and/or entitlement at the defect origination process using pre-determined tools from Six Sigma, Lean Manufacturing tools and Kaizen principles.

While the best mode for carrying out the invention has been described in detail, those familiar with the art to which this invention relates will recognize various alternative designs and embodiments for practicing the invention as defined by the following claims.

What is claimed is:

1. A method to analyze a problem statement, the method comprising:
   analyzing a problem statement based on a systematic set of predefined criteria to focus the problem statement in terms of an operational definition;
   assigning a level indicator to the operational definition;
   selecting analysis techniques from a group of analysis techniques associated with Six Sigma, Lean Manufacturing, and Kaizen analysis techniques as a function of the assigned level indicator; and
   analyzing the focused operational definition based on an integration of the selected analysis techniques.

2. The method of claim 1 further comprising defining a multiple-day Six Sigma Kaizen schedule for the integration of Six Sigma, Lean Manufacturing, and Kaizen analysis techniques.

3. The method of claim 2 wherein defining the schedule comprises defining a five-day DMAIC schedule.

4. The method of claim 2 wherein the multiple-day Six Sigma Kaizen schedule includes institutionalized standards and processes for a level II indicator.

5. The method of claim 2 wherein the multiple-day Six Sigma Kaizen schedule includes defect appearance measurement systems and processes for a level III indicator.

6. The method of claim 2 wherein the multiple-day Six Sigma Kaizen schedule includes defect origination process controls for a level IV indicator.

7. The method of claim 1 wherein analyzing the problem statement based on the systematic set of predefined criteria includes a computer graphically displaying a number of instructions to a user for gathering data and inputting data into the computer.

8. The method of claim 7 wherein assigning the level indicator includes the computer automatically assigning the level indicator based on the data inputted into the computer.

9. The method of claim 7 further comprising the computer instructing the analysis of the operational definition based on the level indicator.

10. The method of claim 9 wherein instructing the analysis of the operational definition includes the computer automatically generating a Six Sigma Kaizen schedule based on the level indicator.

11. The method of claim 10 wherein the computer graphically displays the Six Sigma Kaizen schedule in a DMAIC format.

12. A computer configured with instructions for analyzing a problem statement, the computer including instructions for:
   analyzing the problem statement based on a systematic set of predefined criteria to focus the problem statement in terms of an operational definition;
   assigning a level indicator to the operational definition;
   selecting analysis techniques from a group of analysis techniques as a function of the assigned level indicator; and
   analyzing the operational definition based on an integration of the selected analysis techniques.

13. The computer of claim 12 including instructions for analyzing the operational definition based on an integration of Six Sigma, Lean Manufacturing, and Kaizen analysis techniques.

14. The computer of claim 13 wherein the integration instructions include instructions for defining a multiple-day Six Sigma Kaizen schedule.

15. The computer of claim 14 wherein the instructions for the multiple-day Six Sigma Kaizen schedule includes instructions for including institutionalized standards and processes for a level II indicator, instructions for including defect appearance measurement systems and processes for a level III indicator, and instructions for including defect origination process controls for a level IV indicator.

16. The computer of claim 12 wherein the instructions for analyzing the problem statement based on the systematic set of predefined criteria includes instructions for gathering data and inputting data into the computer.

17. The method of claim 16 wherein the computer automatically assigns the level indicator based on the data inputted into the computer.

18. The method of claim 17 wherein the computer further provides instructions for analyzing the operational definition based on the level indicator.

19. The method of claim 18 wherein the computer automatically generates a Six Sigma Kaizen schedule based on the level indicator.

20. The method of claim 19 wherein the computer graphically displays the Six Sigma Kaizen schedule in a DMAIC format.

* * * * *